United States Patent
Andréasson et al.

(10) Patent No.: US 11,990,033 B2
(45) Date of Patent: May 21, 2024

(54) METHOD FOR CONTROLLING VEHICLES (71) Applicant: CPAC SYSTEMS AB, Gothenburg (SE)

(72) Inventors: Mathias Andréasson, Västra Frölunda (SE); Tomas Hasselquist, Gothenburg (SE); Elad Michael Schiller, Gothenburg (SE)

(73) Assignee: CPAC SYSTEMS AB, Gothenburg (SE)

( * ) Notice: Subject to any disclaimer, the term of this patent is extended or adjusted under 35 U.S.C. 154(b) by 640 days.

(21) Appl. No.: 16/972,900

(22) PCT Filed: Jun. 8, 2018

(86) PCT No.: PCT/EP2018/065129
§ 371 (c)(1),
(2) Date: Dec. 7, 2020

(87) PCT Pub. No.: WO2019/233593
PCT Pub. Date: Dec. 12, 2019

(65) Prior Publication Data
US 2021/0312800 A1 Oct. 7, 2021

(51) Int. Cl.
*G08G 1/01* (2006.01)
*G08G 1/04* (2006.01)
*G08G 1/09* (2006.01)
*G08G 1/0967* (2006.01)
*G08G 1/16* (2006.01)
*H04W 4/44* (2018.01)

(52) U.S. Cl.
CPC .......... *G08G 1/0145* (2013.01); *G08G 1/04* (2013.01); *G08G 1/093* (2013.01); *G08G 1/096725* (2013.01); *G08G 1/096741* (2013.01); *G08G 1/096775* (2013.01); *G08G 1/164* (2013.01); *H04W 4/44* (2018.02)

(58) Field of Classification Search
CPC ........ G08G 1/0145; G08G 1/04; G08G 1/093; G08G 1/096725; G08G 1/096741; G08G 1/096775; G08G 1/164; H04W 4/44
See application file for complete search history.

(56) References Cited

U.S. PATENT DOCUMENTS 3,663,937 A   5/1972   Bolner
5,539,398 A   7/1996   Hall et al.
9,459,623 B1 * 10/2016  Raghu ............... G01S 13/931
(Continued)

FOREIGN PATENT DOCUMENTS

WO    2017045147 A1   3/2017

OTHER PUBLICATIONS

Edward Andert et al., "Crossroads", Proceedings of the 54th Annual Design Automation Conference 2017, Jun. 18, 2017, XP055561779, pp. 1-6.

(Continued)

*Primary Examiner* — Hussein Elchanti
(74) *Attorney, Agent, or Firm* — Venable LLP; Jeffri A. Kaminski (57) ABSTRACT

The present disclosure generally relates to a computer implemented method for controlling vehicles, specifically in relation to a plurality of vehicles passing through an intersection. The present disclosure also relates to a corresponding management server and computer program product.

20 Claims, 2 Drawing Sheets

(56) References Cited

U.S. PATENT DOCUMENTS

| | | | |
|---|---|---|---|
| 2010/0073194 A1 | 3/2010 | Ghazarian | |
| 2013/0018572 A1* | 1/2013 | Jang | G08G 1/164 |
| | | | 701/119 |
| 2013/0211656 A1* | 8/2013 | An | B62D 15/027 |
| | | | 701/25 |
| 2013/0304279 A1 | 11/2013 | Mudalige et al. | |
| 2016/0161271 A1* | 6/2016 | Okumura | B60W 30/18154 |
| | | | 701/25 |
| 2016/0200334 A1* | 7/2016 | Hilleary | B61L 29/30 |
| | | | 246/218 |
| 2016/0328963 A1* | 11/2016 | Yao | G08G 1/0133 |
| 2017/0132915 A1 | 5/2017 | Cross et al. | |
| 2018/0096596 A1* | 4/2018 | Lee | G08G 1/207 |
| 2018/0188745 A1* | 7/2018 | Pilkington | G05D 1/0295 |
| 2018/0204450 A1* | 7/2018 | Song | G08G 1/164 |
| 2018/0299882 A1* | 10/2018 | Kichkaylo | G05B 19/418 |
| 2018/0345955 A1* | 12/2018 | Kim | B60R 1/00 |

OTHER PUBLICATIONS

International Search Report and Written Opinion dated Mar. 6, 2019 in corresponding International PCT Application No. PCT/EP2018/065129, 11 pages.

International Preliminary Report on Patentability dated Sep. 18, 2020 in corresponding International PCT Application No. PCT/EP2018/065129, 22 pages.

European Office Action dated Jun. 15, 2023 in corresponding European Patent Application No. 18736804.8, 7 pages.

\* cited by examiner

METHOD FOR CONTROLLING VEHICLES

CROSS-REFERENCE TO RELATED APPLICATIONS

This application is a U.S. National Stage application of PCT/EP2018/065129, filed Jun. 8, 2018, and published on Dec. 12, 2019, as WO 2019/233593 A1, all of which is hereby incorporated by reference in its entirety.

TECHNICAL FIELD

The present disclosure generally relates to a computer implemented method for controlling vehicles, specifically in relation to a plurality of vehicles passing through an intersection. The present disclosure also relates to a corresponding management server and computer program product.

BACKGROUND

There is an ongoing development to minimize the amount of user interaction needed when operating a vehicle, specifically towards semi or fully autonomous vehicle. General cruise control systems have been on vehicles for a number of years, where the driver can set a particular speed of the vehicle, and the vehicle will maintain that speed without the driver operating the throttle. Adaptive cruise control systems have been disclosed, where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect the vehicle stability. Furthermore, some vehicle systems attempt to maintain the vehicle near the center of a lane on the road, so called lane keeping.

In a next step towards a fully autonomous vehicle handling, there is a need to also handle intersections, i.e. areas where multiple vehicles are to cross path. To ensure high safety through an intersection, one has traditionally relied on traffic control mechanism, such as stop signs, yield signs, traffic lights, etc. However, in transitioning towards semi or fully autonomous vehicle it is presumed to also be possible to reduce the present congestion relating to intersection crossing.

An example of an interesting solution in this regards is presented in US20130304279. US20130304279 disclose a system and method for providing control of vehicle steering and speed through an intersection and, more particularly, to a system and method for providing autonomous control of vehicle steering and speed through an intersection, where the intersection is defined as to whether it allows vehicle travel in certain lanes straight through the intersection, left turns, right turns, or combinations thereof. The solution presented in US20130304279 focus on providing a remote server for broadcasting, using wireless network communication, a synchronization signal to all vehicles that will be entering an area surrounding the intersection, where the synchronization signal dictates when and how the vehicles are to pass a critical area of the intersection, e.g. where vehicles may enter from different directions.

However, the solution proposed in US20130304279 fails to present any information relating to issues that may stem from network communication mishaps between e.g. the remote server and the vehicles. As such, there appears to be room for further improvements, where also the mentioned possible communication problem is taken into account.

SUMMARY

In accordance to another aspect of the present disclosure, the above is at least partly alleviated by means of a computer implemented method for controlling a plurality of vehicles passing through an intersection using a server connected to the vehicles using a network connection, the intersection comprising a crossing zone and a registration zone, the registration zone arranged outside a periphery of the crossing zone, wherein the method comprises the steps of receiving, at the server from each of the plurality of vehicles, a request for crossing the crossing zone of the intersection, wherein the request is transmitted from the vehicle when the vehicle enters the registration zone and the request comprises an indication of a time when the vehicle entered the registration zone, determining, at the server, an order for the plurality of vehicles to cross the crossing zone of the intersection, wherein the determination of the order is at least based on the indication of the time when the vehicles entered the registration zone, selecting, at the server, a first vehicle from the order of the plurality of vehicles to pass the crossing zone, and transmitting, from the server to the first vehicle, a first instruction to pass the crossing zone of the intersection.

The present disclosure is based on the understanding that the network communication between the vehicles and the server may be prone to e.g. communication delays, possibly resulting in unwanted congestions and possible safety issues with the vehicles that are to pass the intersection. That is, when generally implementing any form of network communication between devices (such as the plurality of vehicles and the server), there may be issues relating e.g. to delays in the information transmitted there-between.

Accordingly, to ensure that the vehicles are allowed to pass the intersection in the best possible way and with a minimum amount of delay, the inventors have identified that it is desirable to introduce timing information (such as a time stamp) relating to when the vehicles are approaching the intersection. Thus, in line with the present disclosure the intersection is "divided" into (at least) two zones, in the description defined as a crossing zone and a registration zone.

The crossing zone may in line with the present disclosure be seen as a critical area where e.g. two vehicles possibly may meet and a collision may take place. Thus, in the crossing zone it is desirable to only allow one vehicle at a time. The crossing zone may in line with the present disclosure be any area where e.g. two vehicles may meet. Thus, the crossing zone may not necessarily be a lane marked area, but may also be a "virtual" unmarked area.

In a corresponding manner, the registration zone is arranged outside a periphery of the crossing zone. The registration zone may for example be defined as a "circle" around the crossing zone. However, the registration zone may, as with the crossing zone, be arranged to have any arbitrary shape or form (typically two-dimensional but possibly also three-dimensional). The present disclosure is thus applicable to land, sea, air related intersections. The discussion below will however be provided in regards to a land (road) related intersection.

In the discussion provided below, the intersection is generally referred to as a typical two-dimensional four-way intersection. However, the concept according to the present disclosure may, as indicated above, be of any type. That is, the intersection in line with the present disclosure may also, in addition to a general critical area where e.g. two vehicles possibly may meet and a crash may take place, be e.g. a roundabout or an arbitrary number intersection (e.g. two, three, four, five, six, etc.). Other present and future intersection types are also possible and within the scope of the present disclosure.

In addition, to keep the discussion at a suitable and less cluttered level, the discussion in line with the present disclosure is provided based on a simplified model where one vehicle is allowed to pass the crossing zone at a time. The concept according to the present disclosure should however be understood to be applicable also in the situations where more "complicated" intersections are present, meaning that a "larger" intersection may comprise also a plurality of crossing zones.

Accordingly, in the exemplary four-way intersection there may be possible to allow more than one vehicle to pass at a time, depending on the intended direction of passing the crossing zone. As such and in regards to a four-way intersection arranged in a north-south-west-east manner, e.g. a first vehicle may be allowed to e.g. turn from south to east, while a second vehicle at the same time may be allowed to turn from north to west. Thus, in this embodiment the intersection may be seen as comprising a plurality of crossing zones, or that the overall crossing zone is "dynamic" dependent on the intended direction of travel. Furthermore, the crossing zone may be dependent on the type of vehicle. For example, an in comparison larger vehicle such as a bus or a truck may need a larger area for allowing a turn to take place (or to perform a U-turn), as compared to a smaller area such as in regard to a "normal" passenger car. The concept according to the present disclosure is equally applicable.

Accordingly, the concept according to the present disclosure is equally applicable to cars, busses, trucks, any other heavy vehicles or working machines. Furthermore, the concept according to the present disclosure is specifically useful in regards to semi or fully autonomous vehicles. However, it may also be possible and within the scope of the present disclosure to e.g. provide a user interface within a non-autonomous vehicle, where such a user interface may be provided for instructing the driver of when and how to pass the crossing zone of the intersection, i.e. in line with present disclosure.

The solution according to the present disclosure will this be less affected in case of e.g. an in comparison short communication delay in regards to the request transmitted from the vehicles to the server, as the registration zone will function as a "buffer" before the vehicle are arriving at the crossing zone. Accordingly, it is preferred to arrange the registration zone to "start" at a predetermined distance from the crossing zone, allowing for this short delay. Thus, in some embodiments the registration zone starts at least at a distance from the crossing zone where it takes the vehicles at least two-five seconds before reaching the crossing zone.

In addition, in line with the present disclosure the order of the plurality of vehicles may be allowed to be dynamically updated. In practice this may for example result in that in case there is a communication delay in relation to a first vehicle that arrived at the registration zone at an early point in time, as compared to a second vehicle arriving at the registration zone later but with no communication delay, then the order may be updated in such a manner that the first vehicle in the end will be allowed to pass through the crossing zone before the second vehicle is allowed to pass the crossing zone.

Accordingly, advantages following the present disclosure for example include "fairness" in passing the crossing zone, which in turn will result in less congestion due to undesirable waiting periods that resulted from the communication delay. Preferably and in line with the discussion above, the step of determining the order for the vehicles to cross the crossing zone of the intersection is time based.

In line with the present disclosure, it is desirable to allow the plurality of vehicles not receiving the instruction to pass the crossing zone of the intersection transmitted from the server are disallowed to enter the crossing zone of the intersection. The vehicles must thus according to this embodiment await a distinct instruction from server before being allowed to pass the crossing zone. Such an implementation will effectively ensure high safety in regards to the crossing, ensuring that only the selected vehicle is passing the crossing zone.

In an embodiment of the present disclosure, the request for crossing the crossing zone of the intersection also comprises a priority tag and the step of determining the order for the vehicles to cross the crossing zone of the intersection is further based on the priority tag. Such a priority tag may for example be different for different types of vehicles. For example, emergency vehicles may be given priority over general vehicles (i.e. a priority tag indicative of an in comparison higher priority). Also, hazardous transports (vehicles) may be provided with a tag giving higher priority to pass the intersection.

In addition, some other types of vehicles (in addition to emergency vehicles) may be allowed to have priority before other vehicles. Such prioritized vehicles may for example also include heavy vehicles (such as tucks, etc.), where the reduction in speed and/or possible waiting before the crossing zone would result in unwanted energy consumption for the heavy vehicle.

Furthermore, in line with the present disclosure it is desirable to allow the method to further comprise determining if an obstacle is present within the crossing zone of the intersection, wherein the step of transmitting the instruction to pass the crossing zone of the intersection is further based on a result of the obstacle determination. Accordingly, if an obstacle (in some way) is detected within the crossing zone it is typically desirable to halt any vehicles from entering the crossing zone. An obstacle may in line with the present disclosure be any form of object or similar that in some way would provide for an increased risk in passing the crossing zone. The obstacle may thus be an object unintentionally left within the crossing zone, a pedestrian, a bicycle, a halted vehicles, etc.

The determination of if such an obstacle is present may for example take place by arranging e.g. a camera (or any combination of sensory devices) in communication with the server, where the camera is adapted to take images or a video sequence of the crossing zone, and where the server and/or the camera may be adapted identify the obstacle using well known image processing means. As an alternative, the determination of obstacle may also or alternatively be performed using information from e.g. a vehicle at or in the vicinity of the crossing zone (e.g. vehicles equipped with cameras, radar, etc.). Also, a vehicle that in an disallowed manner has entered the crossing zone may itself report the fact that the "own vehicle" is an acting as an (unintended) obstacle within the crossing zone. The determination may also be performed using statistical prediction methods that may use the information collected from the above mentioned camera(s) and sensor(s).

Furthermore, it is preferred to further allow for the first vehicle to transmit, to the server, an indication that the first vehicle has left the crossing zone of the intersection, and adjusting the order based on the indication. Accordingly, once the first vehicle has left the crossing section a further (second) vehicle in the list of the plurality of vehicles may be allowed to pass the intersection (i.e. a second instruction to pass the crossing zone of the intersection is transmitted to the second vehicle). As an alternative, e.g. the above mentioned camera may capture information in regards to the first vehicle, and provide this information for determining that the first vehicle has left the crossing zone.

According to another aspect of the present disclosure, there is provided a management server for controlling a plurality of vehicles passing through an intersection, the management server connected to the vehicles using a network connection, the intersection comprising a crossing zone and a registration zone, the registration zone arranged outside a periphery of the crossing zone, wherein the management server is adapted to receive, from each of the plurality of vehicles, a request for crossing the crossing zone of the intersection, wherein the request is transmitted from the vehicle when the vehicle enters the registration zone and the request comprises an indication of a time when the vehicle entered the registration zone, determine an order for the vehicles to cross the crossing zone of the intersection, wherein the determination of the order is at least based on the indication of the time when the vehicles entered the registration zone, select a first vehicle from the order of the plurality of vehicles to pass the crossing zone, and transmit to the first vehicle, a first instruction to pass the crossing zone of the intersection. This aspect of the present disclosure provides similar advantages as discussed above in relation to the previous aspect of the present disclosure.

Preferably, the network connection is a vehicle to infrastructure (V2I) connection. Other known or future device-to-device (D2D) communication techniques are also possible. However, one exemplary existing technique that is specifically suitable for V2I applications is the IEEE standard 802.11p, based on the PHY and MAC layer of 802.11, i.e. OFDM and CSMA, respectively. Data broadcasts of IEEE 802.11p include information related to the position of the source, e.g. a vehicle. OFDM and CSMA refer to Orthogonal Frequency Division Multiplex and Carrier Sensing Multiple Access, respectively. It may however also or additionally be possible to use network communications using e.g. one of satellite, Wi-Fi, radio service, or any form of cellular signals.

In a possible embodiment of the present disclosure, the server is a cloud server. As such, the server must not necessarily be arranged adjacently to the intersection, but may be arranged essentially at any position for performing the concept according to the present disclosure. It may also, within the scope of the present disclosure be possible to use any other external computation unit for the same purpose as the cloud server.

The management server is preferably arranged as a component of an intersection handling system, further comprising a plurality of electronic control devices adapted for communication with the management server, wherein each of the plurality of electronic control devices is arranged in a vehicle, the electronic control device adapted for controlling when to allow the vehicle to pass the crossing zone of the intersection.

According to a still further aspect of the present disclosure, there is provided a computer program product comprising a non-transitory computer readable medium having stored thereon computer program means for operating a management server for controlling a plurality of vehicles passing through an intersection, the management server connected to the vehicles using a network connection, the intersection comprising a crossing zone and a registration zone, the registration zone arranged outside a periphery of the crossing zone, wherein the computer program product comprises code for receiving, at the server from each of the plurality of vehicles, a request for crossing the crossing zone of the intersection, wherein the request is transmitted from the vehicle when the vehicle enters the registration zone and the request comprises an indication of a time when the vehicle entered the registration zone, code for determining, at the server, an order for the vehicles to cross the crossing zone of the intersection, wherein the determination of the order is at least based on the indication of the time when the vehicles entered the registration zone, code for selecting, at the server, a first vehicle from the order of the plurality of vehicles to pass the crossing zone, and code for transmitting, from the server to the first vehicle, a first instruction to pass the crossing zone of the intersection. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1:
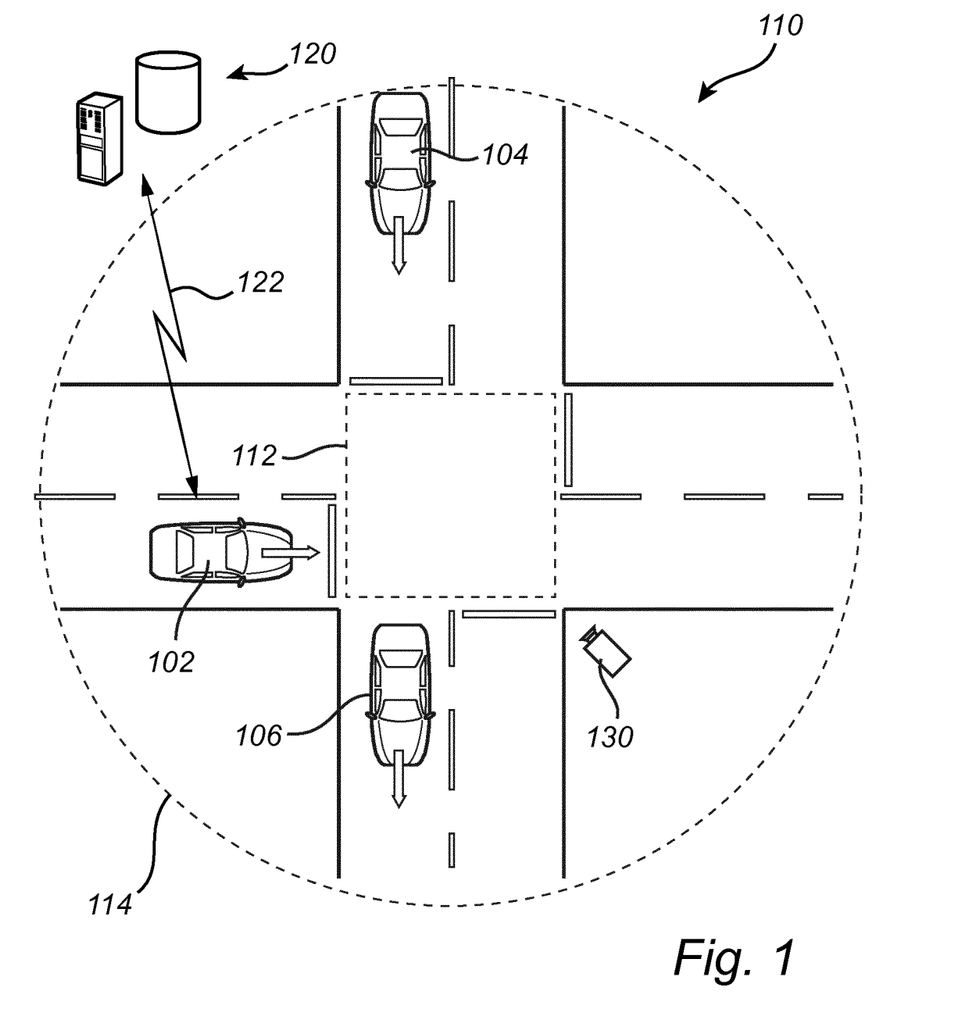
FIG. 1 conceptually illustrates an intersection comprising a server and a plurality of vehicles in line with the present disclosure.
Figure 3:
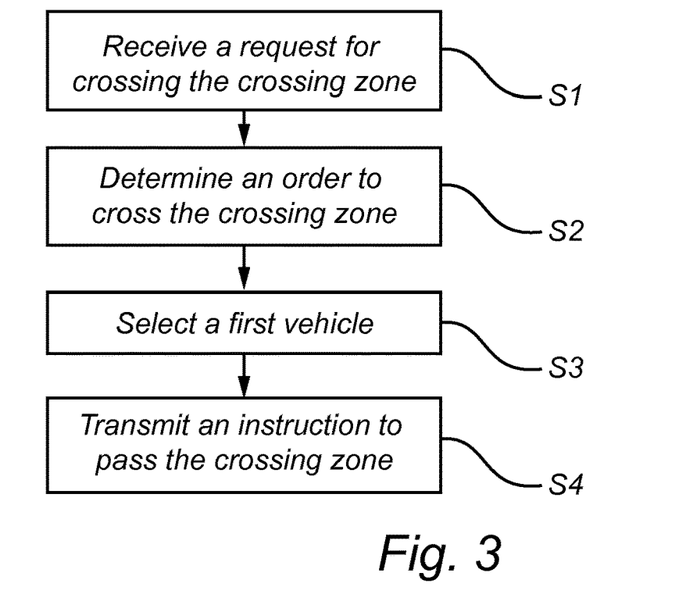
FIG. 3 shows a flow chart of a method according to an embodiment of the present disclosure.

Referring now to the drawings and to FIGS. 1 and 3 in particular, there is conceptually depicted an intersection 110 where the concept according to the present disclosure may be applicable. The intersection 110 as is shown in FIG. 1 is a typical two-dimensional, two-lane, four-way intersection. The intersection 110 is in turn divided into a centrally arranged crossing zone 112 and a registration zone 114 arranged outside a periphery of the crossing zone 112.

A plurality of vehicles 102, 104, 106 are within an overall area of the intersection 110. The vehicle 106 has left the crossing zone 112, while both the vehicle 102 and the vehicle 104 are travelling towards the crossing zone 112. If the vehicles 102 and 104 would be allowed to simply proceed forward, it may be a chance that they would collide within the crossing zone 112.

Accordingly, in line with the present disclosure, once the vehicles 102, 104, 106 are entering within the registration zone 114; they would all themselves communicate a request to a management server 120, using a network connection 122 as exemplified above. The request comprises an indication of a time when the vehicle entered the registration zone 114. Thus, the vehicles may for example be provided with a GPS receiver, providing a synchronized time for the plurality of vehicles. Other time synchronization means are of course possible and within the scope of the present disclosure.

The server 120 would in turn receive, S1, the request from the plurality of vehicles 102, 104 (in the illustrated example not vehicle 106 as this vehicle has already left the crossing zone) that entered into the registration zone 114. The server 102 then determines, S2, an order for the plurality of vehicles 102, 104, to cross the crossing zone 112 of the intersection 114, wherein the determination of the order is at least based on the indication of the time when the vehicles entered the registration zone 114, i.e. the time indication comprised with the request transmitted from the plurality of vehicles 102, 104 to the server 102.

In the illustrated example shown in FIG. 1, the vehicle 102 is exemplified to have entered the registration zone before the vehicle 104. However, in an exemplary situation in line with the present disclosure the request that was transmitted from the vehicle 102 to the server 120 was delayed, meaning that the request from the vehicle 104 to the server 104 was received at the server before the request from the vehicle 102.

Thus, if not implementing the solution according to the present disclosure, the vehicle 104 may have been instructed to pass the crossing zone 112 before the vehicle 102, meaning that the vehicle 102 would have had to wait before entering the crossing zone 102. However, in line with the present disclosure the order is determined based on when the vehicle entered the registration zone 114, not when the request was received at the server 120. Accordingly, in the example provided in FIG. 1, even though the request from the vehicle 102 was slightly delayed (e.g. due to a communication failure, such as packet loss), the order will be based on the actual time when the vehicles entered the registration zone 120. Therefore, the vehicle 102 is to pass the crossing zone 112 before the vehicle 104.

Based on the determination of the order, the "correct" vehicle 102 is selected, S3, and a first instruction is transmitted, S4, to the vehicle 102 to pass the crossing zone 112 of the intersection 110.

Accordingly, the vehicle 104 is indirectly based on not receiving an instruction to pass the crossing zone 112, disallowed to pass the crossing zone 112. It may of course be possible and within the scope of the present disclosure to explicitly instruct (e.g. to send an instruction from the server 120 to the vehicle 104) the vehicle 104 not to pass the crossing zone 112 until receiving further notice.

Once the vehicle 102 has passed the crossing zone 112, the server 120 will be informed (e.g. from the vehicle 102 or other means as discussed above) in this regards and the next vehicle in line may be allowed to pass the crossing zone 112, in this embodiment this next vehicle will be the vehicle 104.

The example provided in FIG. 1 shows only three vehicles 102, 104, 106. There may of course be more or less vehicles to be handled in an intersection. As would be apparent from the above, the concept according to the present disclosure will also handle the situation where the requests transmitted from a plurality of vehicles travelling in the same lane in the same direction is received by the server 120 in the "wrong order". That is, the server 120 will ensure that the order is "corrected" based on the timing information comprised with the requests from the plurality of vehicles.

The fault tolerance properties achieved by means of the presents disclosure considers the system recovery within a bounded time after the occurrence of a non-legitimate sequence of requests and responses. Moreover, in case the system starts in an incoherent state or there is a transient input to the system, say, about the vehicle locations, that is inconsistent with the past, say, due to a rare event of packet corruption, the system has the ability to detect a broad range of such failures and recover within a bounded time while reporting to all vehicles and relevant system components that the system is in recovery mode.

This present disclosure also allows for the possibility to record the sequence of requests granted as well as all other system events, such as fault recovery. These recording can be stored in a database and/or be signed and sent to the vehicles and/or a 3rd party. These recording can then be used for system diagnostics as well as any other study, such as statistics and traffic accident forensics.

As has been discussed above, it may in some embodiments be desirable to equip the crossing zone 112 with functionality for determining if an obstacle is present within the intersection. Such functionality may for example be implemented using e.g. a camera 130 arranged to overlook the crossing zone 112. The camera may periodically or constantly capture an image sequence showing the crossing zone 112, and transmit the same to the server 120. The server 120 may in turn use image processing means for determining if an obstacle is present within the crossing zone 112, and "halt" any vehicles from passing the crossing zone 112 in case there would be a risk to collide with the identified obstacle. It should however be understood that this processing may be performed using other involved components, such as by the vehicles, etc.

In relation to this, in case a vehicle would detect that it (e.g. unintentionally) is within the wrong zone (such as unintentionally within the crossing zone 112), this is to be immediately communicated to the server 120 (by the own vehicle, other vehicles provided with any form of detection means, or the camera 130), whereby a recovery procedure is initiated. Once recovery procedure is initiated, no more vehicles will be allowed to enter the crossing zone 112 until the vehicle being within the wrong zone has left this zone. Once this is done, the server 120 goes back to the normal mode.

Figure 2:
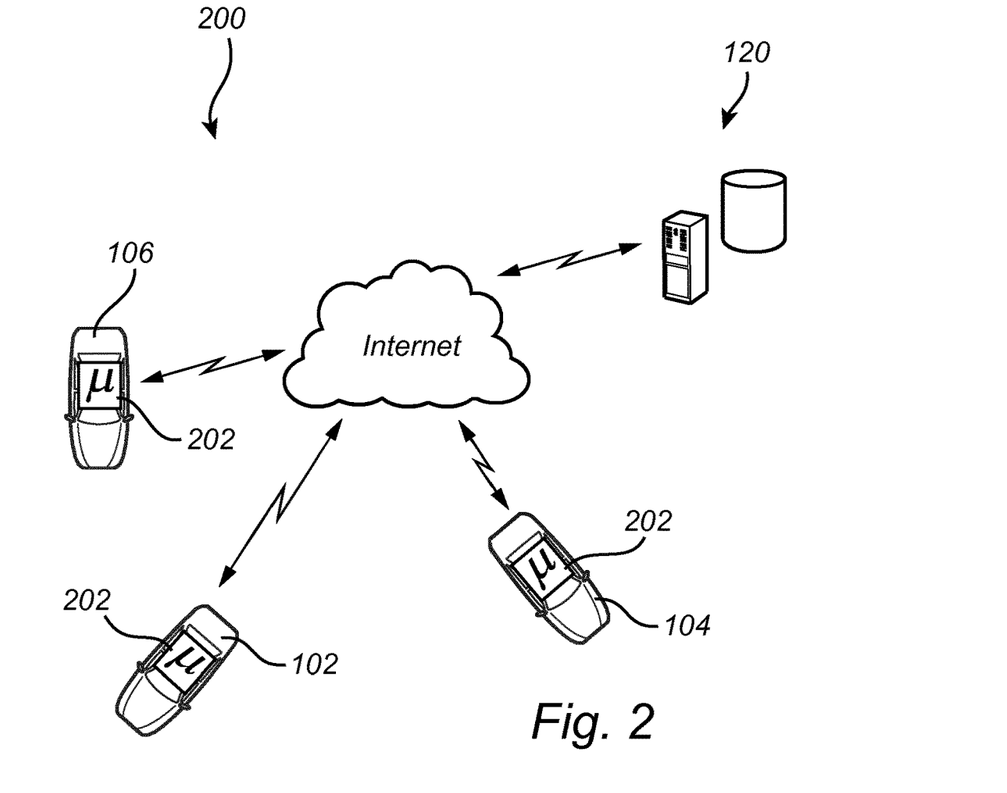
FIG. 2 provides an illustrative example of an intersection handling system in line with the present disclosure.

Turning now to FIG. 2, exemplifying an intersection handling system 200 in line with the present disclosure. Specifically, the vehicles 102, 104, 106 are each provided with an electronic control device 202 adapted for communication with the management server 120. The electronic control device 202 may for example be manifested as a general-purpose processor, an application specific processor, a circuit containing processing components, a group of distributed processing components, a group of distributed computers configured for processing, a field programmable gate array (FPGA), etc.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It should be understood that the electronic control device 202 may be included with a new vehicle, or retrofitted at a later stage. As indicated above, the electronic control device 202 is preferably used for controlling a semi or fully autonomous vehicle. However, the electronic control device 202 may also be provided with some form of user interface (not shown), meaning that the concept according to the present disclosure could be used also for non-autonomous vehicles, where the user interface would be used for instructing the driver of the non-autonomous vehicle when and how to pass the crossing zone 102 of the intersection 110.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for controlling a plurality of vehicles passing through an intersection using a server connected to the vehicles using a network connection, the intersection comprising a crossing zone and a registration zone, the registration zone arranged outside a periphery of the crossing zone, wherein the method comprises:
   receiving, at the server from each of the plurality of, a request for crossing the crossing zone of the intersection, wherein the request is transmitted from the vehicle when the vehicle enters the registration zone and the request comprises an indication of a time when the vehicle entered the registration zone,
   determining, at the server, an order for the plurality of vehicles to cross the crossing zone of the intersection, wherein the determination of the order is at least based on the indication of the time when the vehicles entered the registration zone,
   selecting, at the server, a first vehicle from the order of the plurality of vehicles to pass the crossing zone, and
   transmitting, from the server to the first vehicle, a first instruction to pass the crossing zone of the intersection,
   wherein the step of determining the order for the vehicles to cross the crossing zone of the intersection is time based using a synchronized time for the plurality of vehicles, and the registration zone functions as a buffer before the vehicles are arriving at the crossing zone and extends a predetermined distance out from the periphery of the crossing zone corresponding to a travel duration of two-five seconds for the vehicles, when travelling at an expected speed for the intersection, to reach the crossing zone from entering the registration zone.

2. The method according to claim 1, wherein the plurality of vehicles not receiving the instruction to pass the crossing zone of the intersection transmitted from the server are disallowed to enter the crossing zone of the intersection.

3. The method according to claim 1, wherein determining the order for the vehicles to cross the crossing zone of the intersection is time based.

4. The method according to claim 1, wherein the request for crossing the crossing zone of the intersection comprises a priority tag and the step of determining the order for the vehicles to cross the crossing zone of the intersection is further based on the priority tag.

5. The method according to claim 1, further comprising:
determining if an obstacle is present within the crossing zone of the intersection, wherein the step of transmitting the instruction to pass the crossing zone of the intersection is further based on a result of the obstacle determination.

6. The method according to claim 5, wherein determining if an obstacle is present within the crossing zone of the intersection comprises:
receiving, at the server, at least one of an image and a video sequence of the crossing zone of the intersection, and
analyzing, at the server, the image or video sequence for determining if an obstacle is present within the crossing zone of the intersection.

7. The method according to claim 1, further comprising:
receiving, at the server, an indication that the first vehicle has left the crossing zone of the intersection, and
adjusting the order based on the indication.

8. The method according to claim 7, wherein the indication is received at the server from the first vehicle.

9. The method according to claim 7, wherein the indication is received from a camera arranged to capture an image or video of the intersection.

10. The method according to claim 7, wherein the method further comprises the step of:
transmitting, from the server to a second vehicle of the order of the plurality of vehicles, a second instruction to pass the crossing zone of the intersection.

11. A management server for controlling a plurality of vehicles passing through an intersection, the intersection comprising a crossing zone and a registration zone, the registration zone arranged outside a periphery of the crossing zone, the management server comprising:
a network connection to the vehicles,
a processor;
wherein the processor is configured to:
receive, from each of the plurality of vehicles, a request for crossing the crossing zone of the intersection, wherein the request is transmitted from the vehicle when the vehicle enters the registration zone and the request comprises an indication of a time when the vehicle entered the registration zone,
determine an order for the vehicles to cross the crossing zone of the intersection, wherein the determination of the order is at least based on the indication of the time when the vehicles entered the registration zone,
select a first vehicle from the order of the plurality of vehicles to pass the crossing zone, and
transmit to the first vehicle, a first instruction to pass the crossing zone of the intersection;

wherein the step of determining the order for the vehicles to cross the crossing zone of the intersection is time based using a synchronized time for the plurality of vehicles, and the registration zone functions as a buffer before the vehicles are arriving at the crossing zone and extends a predetermined distance out from the periphery of the crossing zone corresponding to a travel duration of two-five seconds for the vehicles, when travelling at an expected speed for the intersection, to reach the crossing zone from entering the registration zone.

12. The management server according to claim 11, wherein the plurality of vehicles not receiving the instruction to pass the crossing zone of the intersection transmitted from the server are disallowed to enter the crossing zone of the intersection.

13. The management server according to claim 11, wherein determining the order for the vehicles to cross the crossing zone of the intersection is time based.

14. The management server according to claim 11, wherein the request for crossing the crossing zone of the intersection comprises a priority tag and the step of determining the order for the vehicles to cross the crossing zone of the intersection is further based on the priority tag.

15. The management server according to claim 11, wherein the management server is arranged in communication with a sensor arrangement adapted to provide an indication of an obstacle is present within the crossing zone of the intersection.

16. The management server according to claim 15, wherein the sensor arrangement comprises at least a camera.

17. The management server according to claim 16, wherein the management server is further adapted to:
determine, based on an image or video sequence received from the camera, if an obstacle is present within the crossing zone of the intersection, and
transmit a halt instruction to the plurality of vehicles, the halt instruction indicating that the plurality of vehicles are disallowed to enter the crossing zone of the intersection.

18. The management server according to claim 11, wherein the network connection is a vehicle to infrastructure (V2I) connection.

19. An intersection handling system, comprising:
a management server for controlling a plurality of vehicles passing through an intersection, the intersection comprising a crossing zone and a registration zone, the registration zone arranged outside a periphery of the crossing zone, the management server comprising:
a network connection to the vehicles,
a processor;
wherein the processor is configured to:
receive, from each of the plurality of vehicles, a request for crossing the crossing zone of the intersection, wherein the request is transmitted from the vehicle when the vehicle enters the registration zone and the request comprises an indication of a time when the vehicle entered the registration zone,
determine an order for the vehicles to cross the crossing zone of the intersection, wherein the determination of the order is at least based on the indication of the time when the vehicles entered the registration zone,
select a first vehicle from the order of the plurality of vehicles to pass the crossing zone, and
transmit to the first vehicle, a first instruction to pass the crossing zone of the intersection;

wherein the step of determining the order for the vehicles to cross the crossing zone of the intersection is time based using a synchronized time for the plurality of vehicles, and the registration zone functions as a buffer before the vehicles are arriving at the crossing zone and extends a predetermined distance out from the periphery of the crossing zone corresponding to a travel duration of two-five seconds for the vehicles, when travelling at an expected speed for the intersection, to reach the crossing zone from entering the registration zone; and a plurality of electronic control devices adapted for communication with the management server, wherein each of the plurality of electronic control devices is arranged in a vehicle, the electronic control device adapted for controlling when to allow the vehicle to pass the crossing zone of the intersection.

20. A computer program product comprising a non-transitory computer readable medium having stored thereon computer program means for operating a management server for controlling a plurality of vehicles passing through an intersection, the management server connected to the vehicles using a network connection, the intersection comprising a crossing zone and a registration zone, the registration zone arranged outside a periphery of the crossing zone, wherein the computer program product comprises:

code for receiving, at the server from each of the plurality of vehicles, a request for crossing the crossing zone of the intersection, wherein the request is transmitted from the vehicle when the vehicle enters the registration zone and the request comprises an indication of a time when the vehicle entered the registration zone, code for determining, at the server, an order for the vehicles to cross the crossing zone of the intersection, wherein the determination of the order is at least based on the indication of the time when the vehicles entered the registration zone, code for selecting, at the server, a first vehicle from the order of the plurality of vehicles to pass the crossing zone, and code for transmitting, from the server to the first vehicle, a first instruction to pass the crossing zone of the intersection;

wherein determining the order for the vehicles to cross the crossing zone of the intersection is time based using a synchronized time for the plurality of vehicles, and the registration zone functions as a buffer before the vehicles are arriving at the crossing zone and extends a predetermined distance out from the periphery of the crossing zone corresponding to a travel duration of two-five seconds for the vehicles, when travelling at an expected speed for the intersection, to reach the crossing zone from entering the registration zone.

* * * * *